United States Patent [19]
Hasegawa et al.

[11] Patent Number: 5,863,484
[45] Date of Patent: *Jan. 26, 1999

[54] TIRE VULCANIZING METHOD USING A TIRE VULCANIZER

[75] Inventors: Akira Hasegawa; Nobuhiko Irie, both of Nagasaki; Yoshito Mochinaga, Hiratsuka, all of Japan

[73] Assignees: Mitsubishi Jukogyo Kabushiki Kaisha; The Yokohama Rubber Co., Ltd., both of Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 569,008

[22] Filed: Dec. 7, 1995

[30] Foreign Application Priority Data

Dec. 22, 1994 [JP] Japan ................................ 6-32012

[51] Int. Cl.$^6$ .................................................. B29C 35/00
[52] U.S. Cl. ........................ 264/297.5; 264/326; 425/34.1
[58] Field of Search ..................................... 264/326, 315, 264/297.5; 425/34.1, 34.3

[56] References Cited

U.S. PATENT DOCUMENTS

| | | | |
|---|---|---|---|
| 3,082,480 | 3/1963 | Balle et al. . | |
| 3,918,861 | 11/1975 | Klose | 425/47 |
| 3,932,079 | 1/1976 | Legostaev et al. | 425/32 |
| 4,153,405 | 5/1979 | Elly et al. . | |
| 4,804,318 | 2/1989 | Fujieda et al. | 425/34.1 |
| 5,015,165 | 5/1991 | Ozaki et al. | 425/34.1 |
| 5,165,939 | 11/1992 | Pizzorno | 425/34.1 |

FOREIGN PATENT DOCUMENTS

| | | |
|---|---|---|
| 0170109 | 7/1985 | European Pat. Off. . |
| 0459375 | 12/1991 | European Pat. Off. . |
| 0552723 | 1/1993 | European Pat. Off. . |
| 2163750 | 12/1972 | France . |
| 1917081 | 4/1969 | Germany . |
| 1938905 | 11/1971 | Germany . |
| 2513781 | 3/1975 | Germany . |
| 374482 | 2/1964 | Switzerland . |

OTHER PUBLICATIONS

Japanese Patent Provisional Publication No. 2–130109 (130109/90); May 18, 1990.
English Abstract of Japanese Patent Application No. 4–11121 (11121/92); Aug. 10, 1993.

*Primary Examiner*—Mathieu D. Vargot
*Attorney, Agent, or Firm*—Jacobson, Price, Holman & Stern, PLLC

[57] ABSTRACT

(1) During vulcanization, a tire clamping device C is released. (2) After vulcanization has been completed in one tire mold M, the tire mold clamping device C on the side of this tire mold assembly M is operated, so that an upper mold $M_2$ is connected to an upper mold attaching plate 1. (3) The upper mold attaching plate 1 is raised and the upper mold $M_2$ connected to the upper mold attaching plate 1 is opened, while on the side of the other tire mold assembly M, vulcanization is continued with the upper mold $M_2$ being closed. (4) On the side of one tire mold assembly M in which vulcanization has been completed, the removal of the vulcanized tire and the insertion and forming of an unvulcanized tire are carried out in sequence by the procedure similar to the conventional one, and then the upper mold $M_2$ is closed. Then, a predetermined heating/pressurizing medium is supplied to start vulcanization. For the period from this time to the completion of vulcanization, the tire mold clamping device C is released. (5) On the side of the other tire mold assembly M as well, when vulcanization is completed and the time of opening/closing the upper mold $M_2$ is reached, the upper mold $M_2$ is opened and closed by the same procedure.

2 Claims, 9 Drawing Sheets

TIRE VULCANIZING METHOD USING A TIRE VULCANIZER

BACKGROUND OF THE INVENTION

1. Field of the Invention

The present invention relates to a tire vulcanizing method using a tire vulcanizer.

2. Description of the Related Art

A tire vulcanizing process is accomplished as follows: First, a tire is inserted into a tire mold, and then the tire mold is closed while forming. After that, a heating/pressurizing medium is introduced into the tire to vulcanize the tire. Next, the tire mold is mounted on a vulcanizer having a mold opening/closing mechanism. After heating and pressurization are performed for a given time, the tire mold is opened to take out the vulcanized tire.

The aforementioned tire mold opening/closing system includes two systems: a system in which a vertical movement and a horizontal movement are combined (usually called a mechanical crank press) and a system using a vertical action only (usually called a hydraulic press). In general, both of the two systems use two sets of molds for the reasons of productivity and ease of use.

When various types of tires are produced, there is a demand that the producer desires to produce tires requiring different vulcanization times by a set of vulcanizer at the same time. Some of the vertically acting systems which meet this demand have been used practically, but the system in which a vertical movement and a horizontal movement are combined (mechanical crank presses), which meets this command, has not been used practically at present.

The reason for this is that on the mechanical crank press, two sets of molds are used by installing to a set of movable beam, so that the times when the molds of both sets are opened are equal. Therefore, two types of tires requiring different vulcanization times cannot be produced at the same time.

Also, the aforementioned vertically acting system has a complicated configuration because it has mold opening/closing devices individually.

The present invention was made to solve the above problem. Accordingly, an object of the present invention is to provide a tire vulcanizing method using a tire vulcanizer, which can vulcanize plural kinds of tires requiring different vulcanization times by using a conventional mechanical crank press or a hydraulic vulcanizing press.

SUMMARY OF THE INVENTION

The tire vulcanizing method using a tire vulcanizer in accordance with the present invention to achieve the above object will be described below. First, after vulcanization has been completed in one tire mold, a tire mold clamping device on the side of this tire mold assembly is operated, so that an upper mold is connected to an upper mold attaching plate. The upper mold attaching plate is raised and the upper mold connected to the upper mold attaching plate is opened, while on the side of the other tire mold assembly, vulcanization is continued with the upper mold being closed. On the side of one tire mold assembly in which vulcanization has been completed, the removal of the vulcanized tire and the insertion and forming of an unvulcanized tire are carried out in sequence by the procedure similar to the conventional one, and then the upper mold is closed. Then, a predetermined heating/pressurizing medium is supplied to start vulcanization. For the period from this time to the completion of vulcanization, the tire mold clamping device is released. On the side of the other tire mold assembly, when vulcanization is completed and the time of opening/closing the upper mold is reached, the upper mold is opened and closed by the same procedure.

The above description will be explained by following the procedure.

(1) During vulcanization, the tire mold clamping device is released. (2) After vulcanization has been completed in one tire mold, the tire mold clamping device on the side of this tire mold assembly is operated, so that the upper mold is connected to the upper mold attaching plate. (3) The upper mold attaching plate is raised and the upper mold connected to the upper mold attaching plate is opened, while on the side of the other tire mold assembly, vulcanization is continued with the upper mold being closed. (4) On the side of one tire mold assembly in which vulcanization has been completed, the removal of the vulcanized tire and the insertion and forming of an unvulcanized tire are carried out in sequence by the procedure similar to the conventional one, and then the upper mold is closed. Then, a predetermined heating/pressurizing medium is supplied to start vulcanization. For the period from this time to the completion of vulcanization, the tire mold clamping device is released. (5) On the side of the other tire mold assembly as well, when vulcanization is completed and the time of opening/closing the upper mold is reached, the upper mold is opened and closed by the same procedure.

DETAILED DESCRIPTION OF PREFERRED EMBODIMENTS

Figure 1:
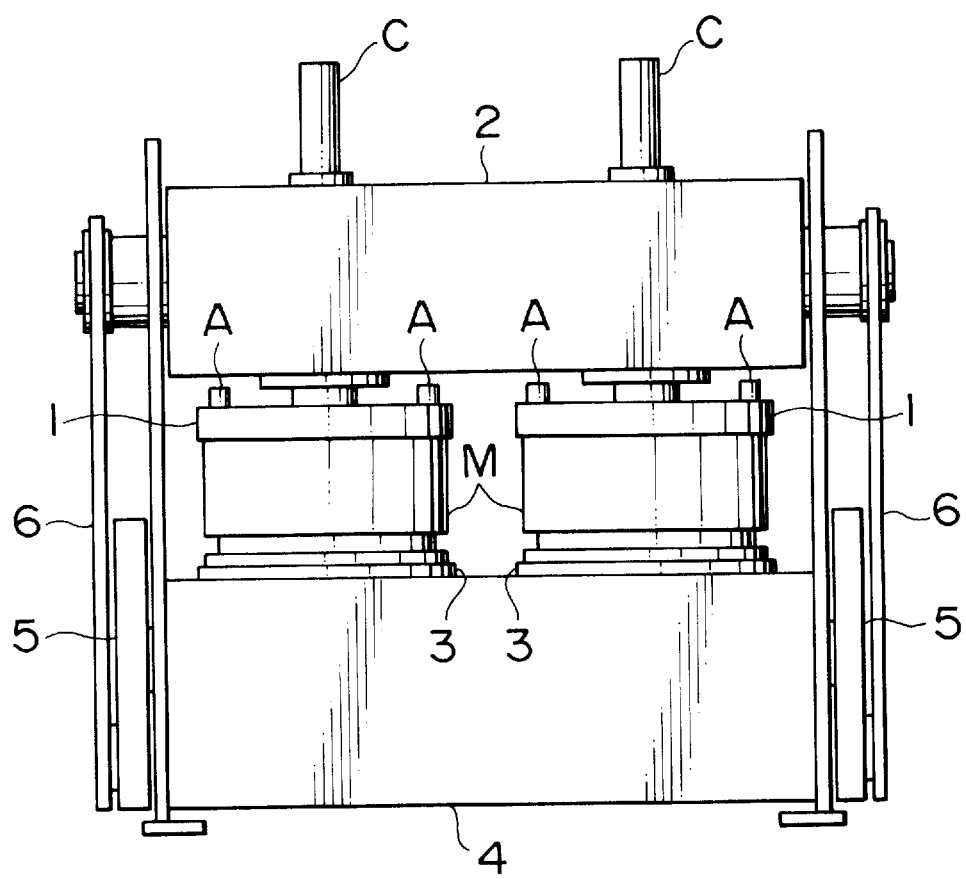
FIG. 1 is a front view of a mechanical crank press used in the execution of a tire vulcanizing method using a tire vulcanizer in accordance with the present invention, showing both tire mold assemblies in a state in which vulcanization is carried out.
Figure 2:
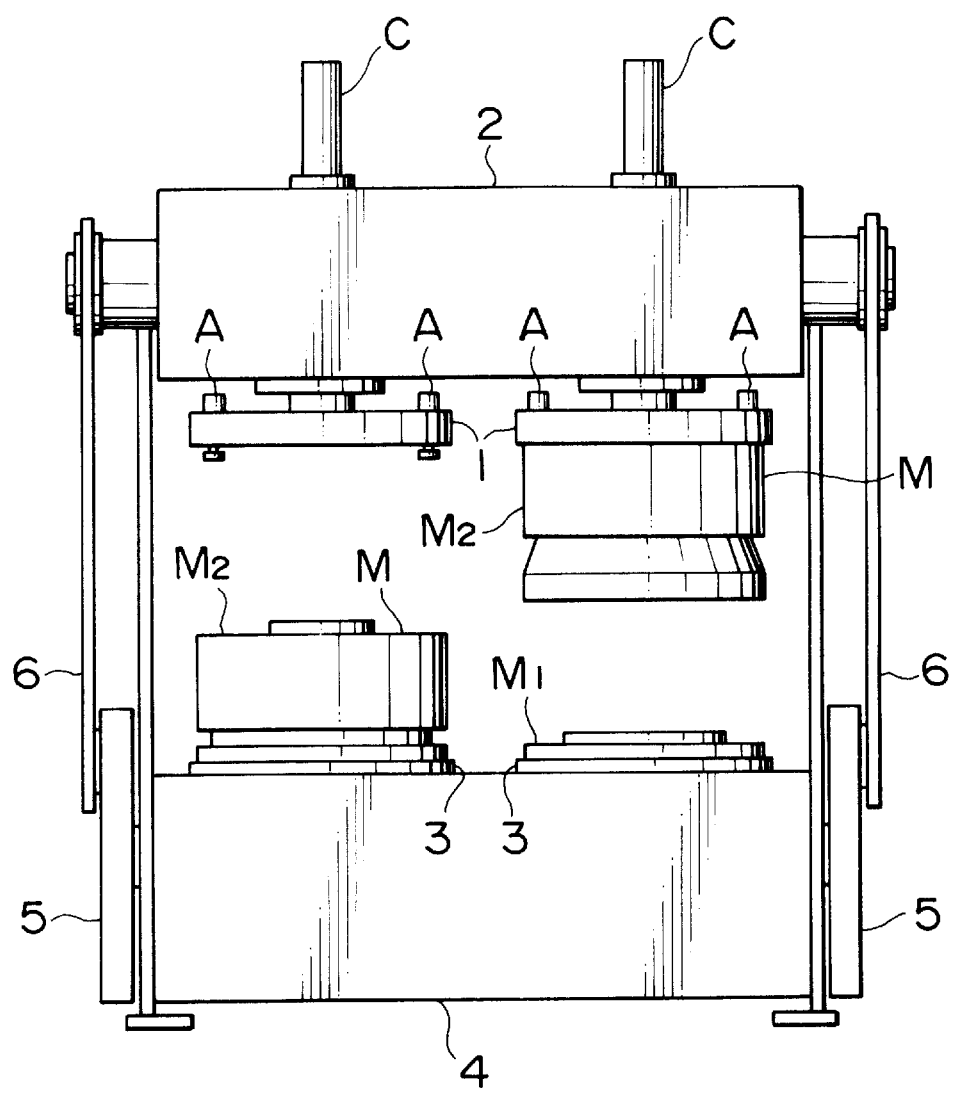
FIG. 2 is a front view of the mechanical crank press shown in FIG. 1, showing a state in which vulcanization is carrying out in a left-hand tire mold assembly, and vulcanization is completed in a right-hand tire mold assembly and an upper mold is open.
Figure 7:
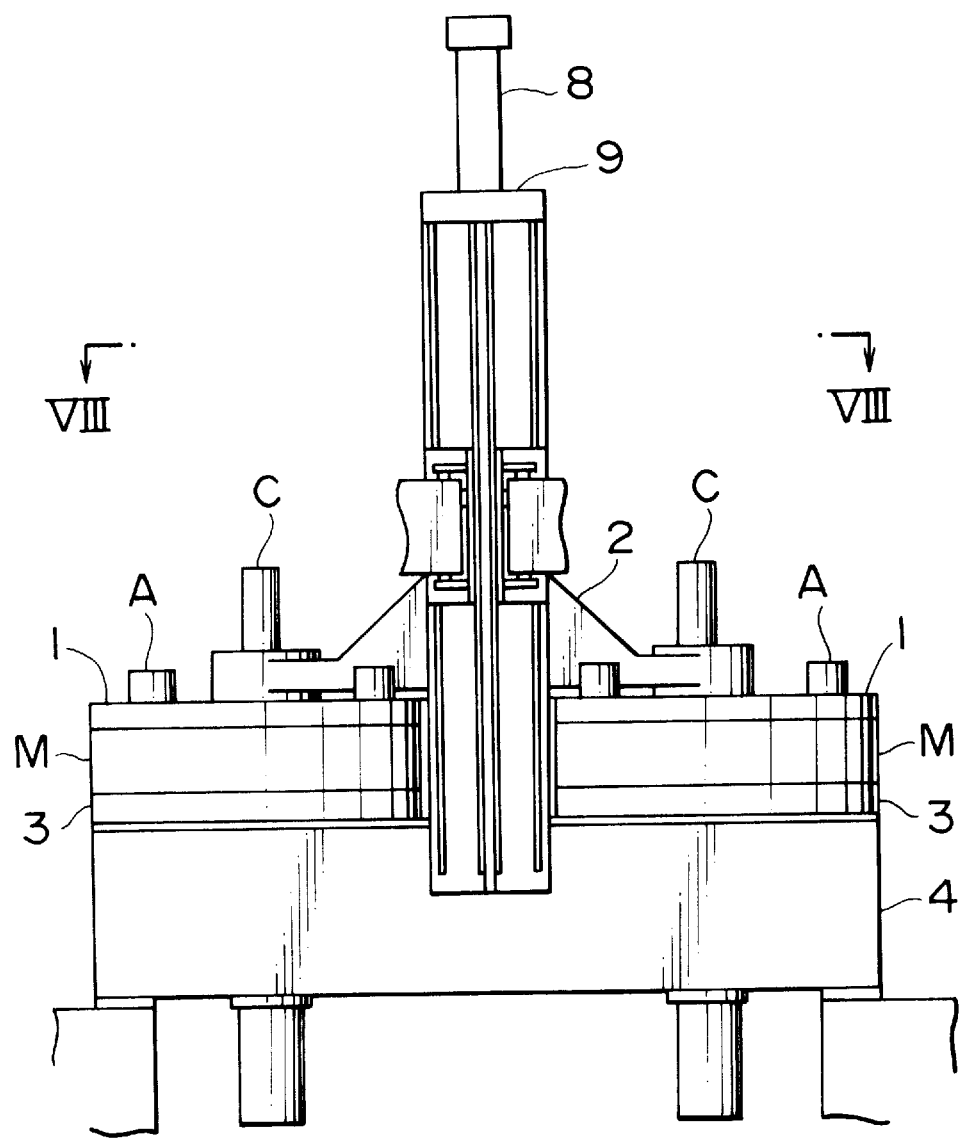
FIG. 7 is a front view of a hydraulic vulcanizing press used in the execution of a tire vulcanizing method using a tire vulcanizer in accordance with the present invention.
Figure 8:
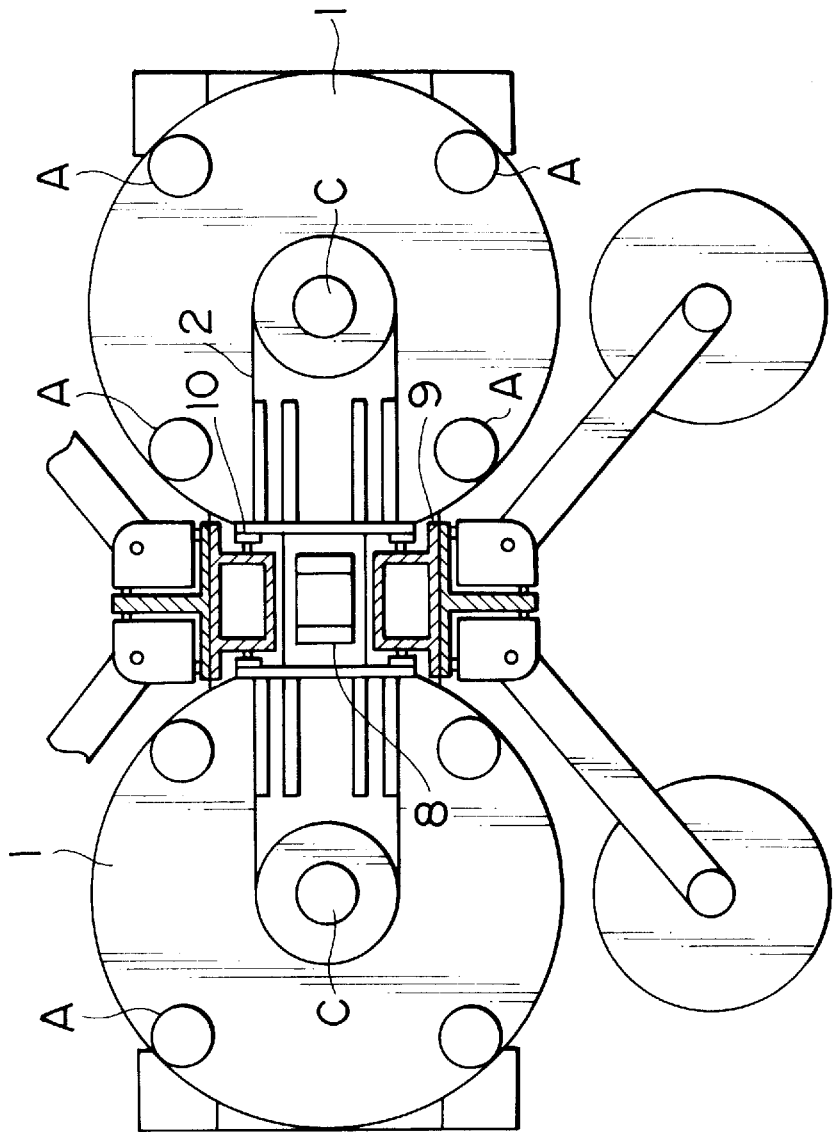
FIG. 8 is a sectional plan view of the hydraulic vulcanizing press taken along the line VIII—VIII of FIG. 7.
Figure 9:
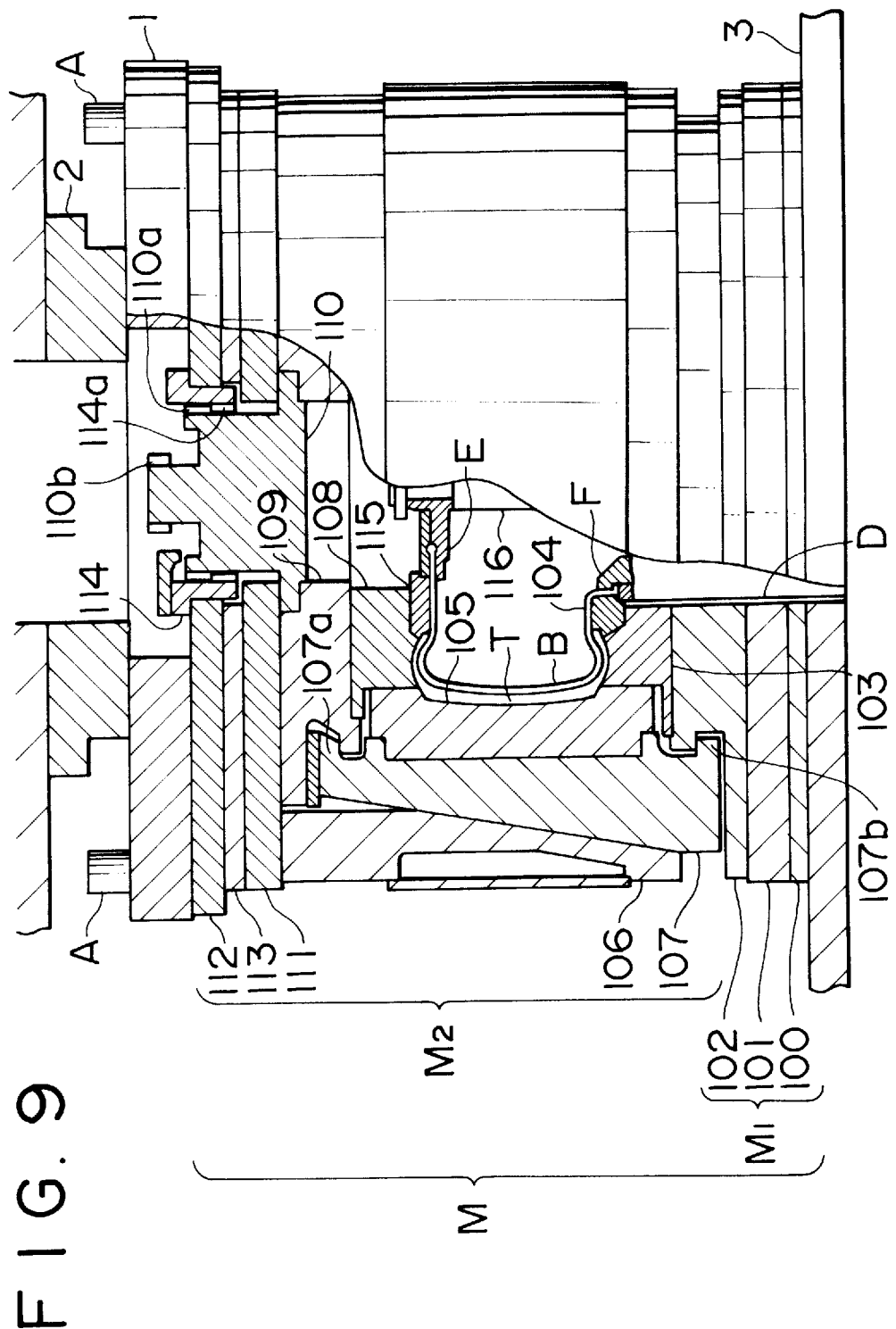
FIG. 9 is a longitudinal sectional side view of a self-lock type split mold device used in the mechanical crank press and the hydraulic vulcanizing press.
Figure 10:
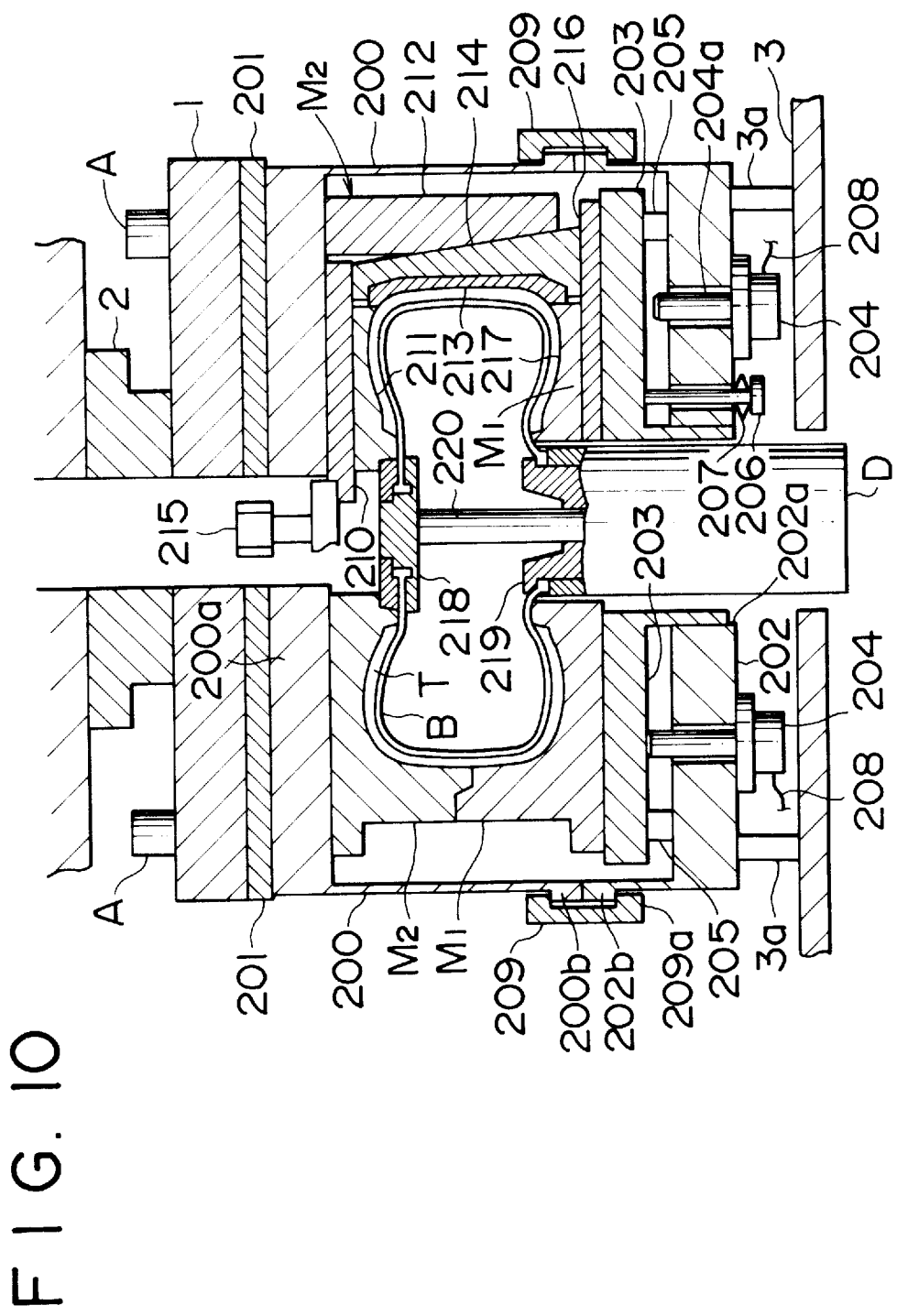
FIG. 10 is a longitudinal sectional side view of s self-lock type mold closing assembly, which is divided into two pieces vertically, used in the mechanical crank press and the hydraulic vulcanizing press.

To carry out a tire vulcanizing method using a tire vulcanizer in accordance with the present invention, a mechanical crank press shown in FIGS. 1 and 2 or a hydraulic vulcanizing press shown in FIGS. 7 and 8 and tire mold assemblies shown in FIGS. 9 and 10 are used.

First, the mechanical crank press will be described with reference to FIGS. 1 and 2.

Figure 3:
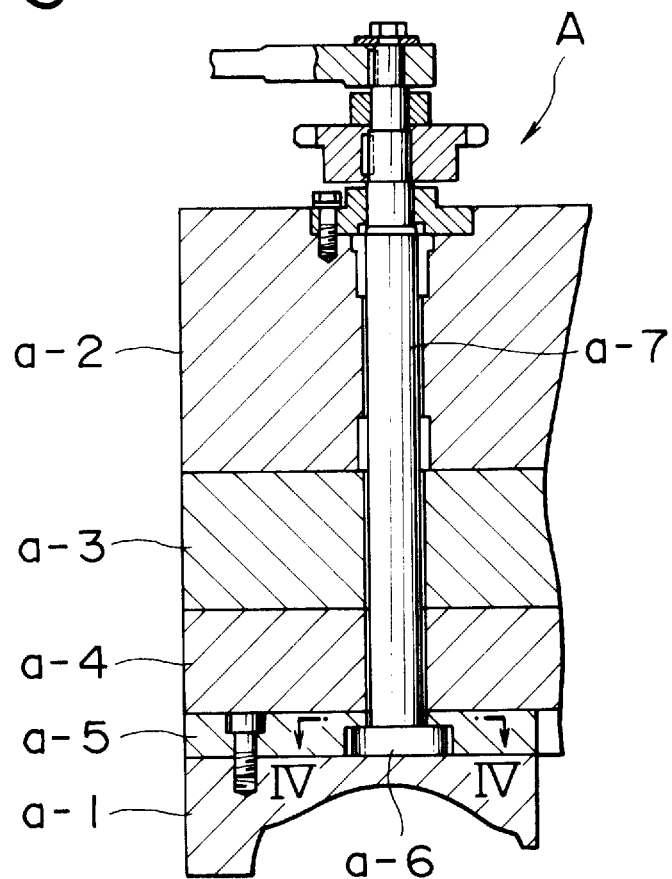
FIG. 3 is an enlarged view of an upper mold clamping device.
Figure 4:
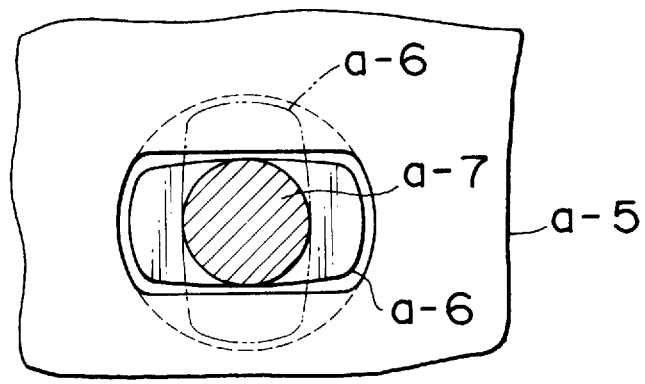
FIG. 4 is a sectional view taken along the line IV—IV of FIG. 3.

Referring to FIGS. 1 and 2, mold attaching plates 1 are assembled to a movable beam 2. The mold attaching plate 1 is provided with a plurality of sets of upper mold clamping devices A, which are known ((refer to Japanese Patent Provisional Publication (KOKAI)No. 2-130109)). The mechanism of this upper mold clamping device A will be described below with reference to FIGS. 3 and 4.

The procedure for setting a mold a-1 is as follows: First, a bolster plate a-2, a heat insulating plate a-3, and an upper hot plate a-4 are raised to the upper limit as a unit to allow a space for the mold a-1 to be carried in. Then, the mold a-1 together with a clamp auxiliary plate a-5 is carried into a vulcanizer by means of materials handling equipment such as a forklift. After that, the bolster plate a-2 is lowered to bring the upper hot plate a-4 into contact with the clamp auxiliary plate a-5. At this time, a clamp claw a-6 is placed at a position indicated by the solid line in FIG. 4, and housed in a hole in the clamp auxiliary plate a-5. Finally, as a clamp rod a-7 is rotated, the clamp claw a-6 turns about 90 degrees as indicated by the two-dot chain line in FIG. 4, so that the clamp auxiliary plate a-5 is clamped to the upper hot plate a-4.

Referring again to FIGS. 1 and 2, a lower mold attaching plate 3 is fixed to a base 4, and a lower mold portion $M_1$ of a tire mold assembly M is attached to the lower mold attaching plate 3. The details of the tire mold assembly M will be described later.

For a tire mold clamping device C, a device of a type described in the specification of Japanese Patent Application No. 6-122661 was used in the present invention.

Figure 5:
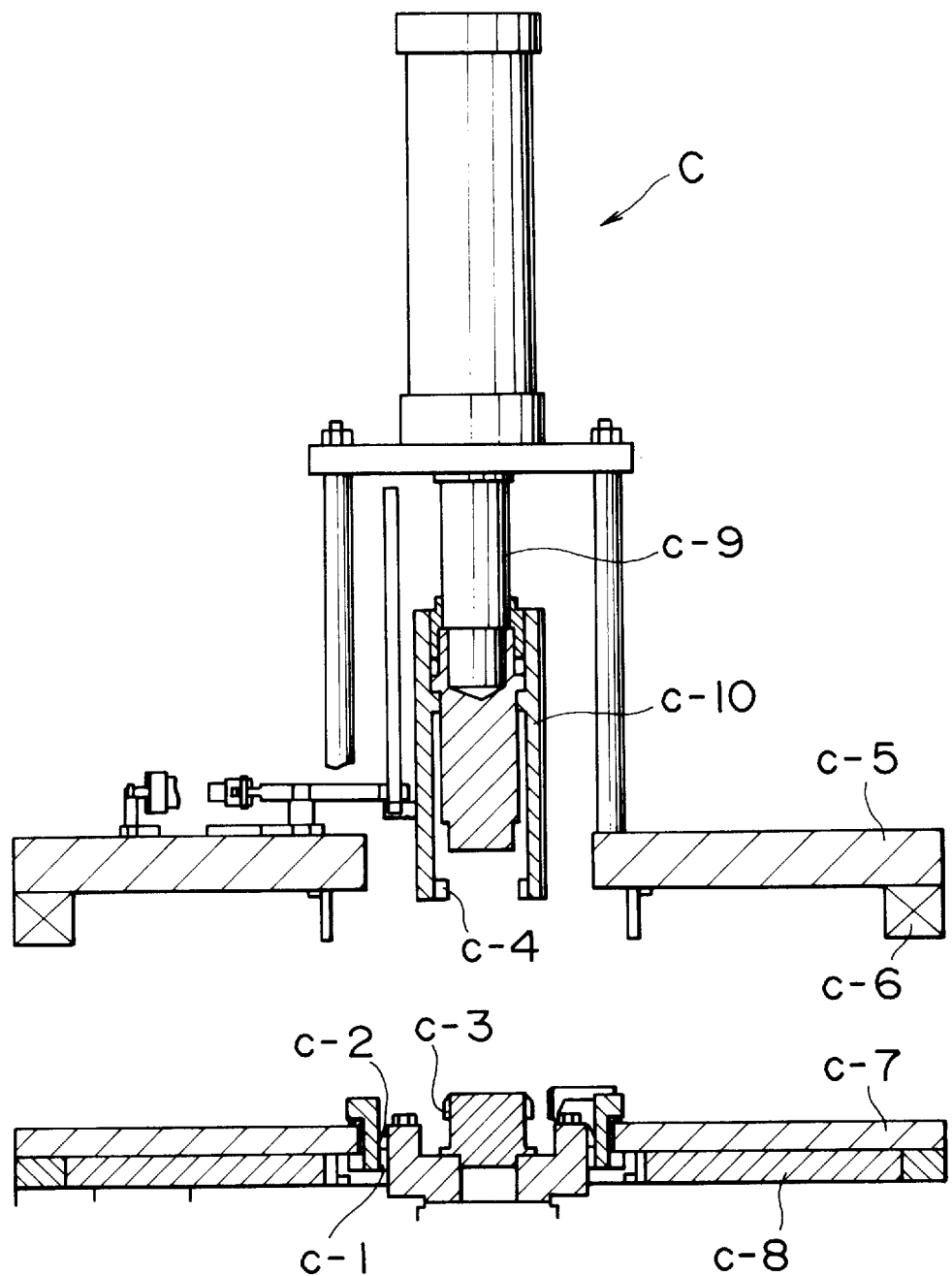
FIGS. 5 and 6 are enlarged sectional views of a tire mold clamping device which can be used in a tire vulcanizing method using a tire vulcanizer in accordance with the present invention.
Figure 6:
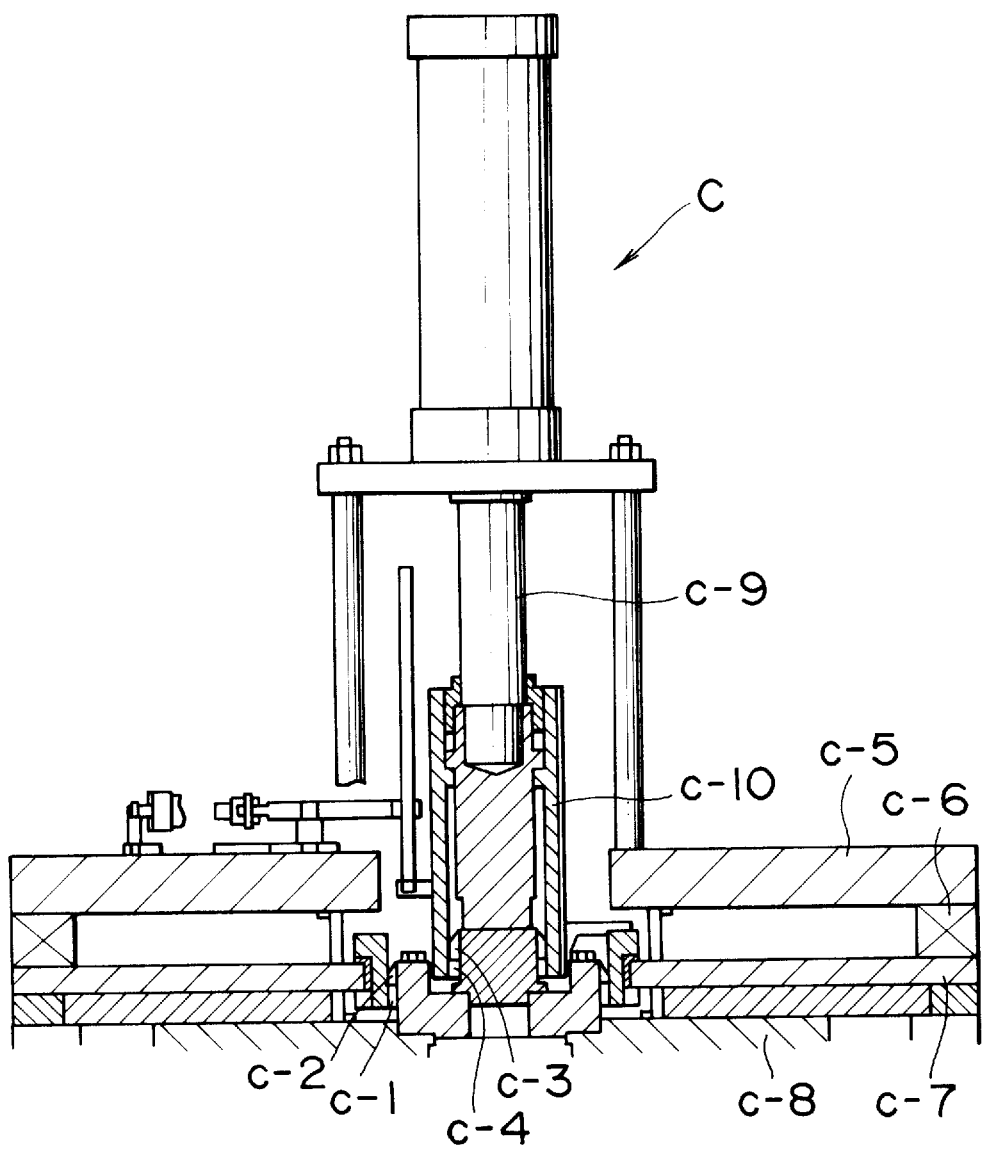

The mechanism of this tire mold clamping device C is as shown in FIGS. 5 and 6.

First, FIG. 5 shows a state in which a claw c-1 and a claw c-2 are engaged with each other and a claw c-3 and a claw c-4 can pass through. Next, a bolster plate c-5 is lowered, and a cover plate c-7 and a cover plate c-5 are engaged with each other by an attaching/detaching device c-6. FIG. 6 shows a state of engagement.

Then, a heating/pressurizing medium in the tire is discharged. After a check is made to see that the pressure has been reduced sufficiently, c-10 is turned to engage the claw c-3 with the claw c-4, so that the upper disk c-8 is connected to a cylinder rod c-9, and the claw c-1 and the claw c-2 are made in a passing state, by which lock is released.

The movable beam 2 is raised and lowered by a crank gear 5 rotatably installed to the base 4 and a side link 6.

FIG. 1 shows a state in which vulcanization is being carried out in both of the tire mold assemblies M, M.

FIG. 2 shows a state described below. Vulcanization has been completed in a right-hand tire mold assembly M, and an upper mold portion $M_2$ is raised by means of the crank gear 5, the side link 6, and the movable beam 2. Right-hand upper mold clamping devices A are operated, so that the upper mold clamping devices A are connected to the upper mold portion $M_2$ of the tire mold assembly M. On the other hand, for left-hand upper mold clamping devices A, the upper mold clamping devices A are not connected to the upper mold portion $M_2$ of the tire mold assembly M. Vulcanization is being carried out in the left-hand tire mold assembly M.

Next, the hydraulic vulcanizing press will be described with reference to FIGS. 7 and 8.

In FIGS. 7 and 8, upper mold attaching plates 1 are assembled to a movable beam 2. Reference character A denotes an upper mold clamping device, 3 denotes a lower mold attaching plate, and 4 denotes a base. A lower mold portion (not shown) of a tire mold assembly M is fixed to the lower mold attaching plate 3.

The movable beam 2 has right and left mold attaching plates 1, and the end portion of piston rod of the elevating cylinder 8 connected to the central portion thereof is connected to the central portion of the movable beam 2. At the center of the base 4, a column 9 is erected, and a body portion of the cylinder 8 is fixed to an appropriate place of the column 9.

The column 9 is provided with guide rails 10, so that the movable beam 2 and the upper mold attaching plate 1 are raised and lowered along the rails 10 by the elevating cylinder 8.

According to such a construction, the right-hand and left-hand molds can be opened and closed separately as shown in FIG. 2 by operating the elevating cylinder 8 and selecting the operation of right and left upper mold clamping devices A.

Next, the tire mold assembly will be described with reference to FIGS. 9 and 10. FIG. 9 shows one configuration of the tire mold assembly M, and FIG. 10 shows another configuration of the tire mold assembly M. These tire mold assembles M can be applied to both of the mechanical crank press shown in FIGS. 1 and 2 and the hydraulic vulcanizing press shown in FIGS. 7 and 8.

First, the tire mold assembly M shown in FIG. 9 will be described.

The tire mold assembly M comprises an upper mold portion $M_2$, which is raised together with an upper mold attaching plate 1 by being connected to the mold attaching plate 1 by the operation of upper mold clamping devices A when the upper mold attaching plate 1 is raised, and a lower mold portion $M_1$, which is left on a lower mold attaching plate 3.

The lower mold portion $M_1$ comprises a heat insulating material 100 placed on the lower mold attaching plate 3, a lower mold heating plate 101, a lower mold base plate 102, a lower side mold 103, and a lower bead ring 104.

The upper mold portion $M_2$ comprises a divided tread mold 105, a segment 107 which supports the tread mold 105 and whose back surface can slide on an outer ring 106, an upper side mold 108, an upper bead ring 115, an upper mold base plate 109 for attaching the side mold, which is disposed above the upper side mold 108, a connecting block 110 fixed to the central portion of the upper mold base plate 109, an upper mold heating plate 111 which is installed to the outer ring 106 to heat the upper mold base plate 109, an upper cover plate 112, a heat insulating material 113 interposed between the heating plate 111 and the cover plate 112, and a lock ring 114 which is rotatably installed at the center of the upper cover plate 112 and has a toothed flange 114a at the inner periphery thereof.

At the upper central portion and the upper outer peripheral portion of the connecting block 110, toothed flanges 110a and 110b are provided. The toothed flange 110a and the toothed flange 114a of the lock ring 114 are engaged with and disengaged from each other by the rotation of the lock ring 114.

At the upper and lower portions of the segment 107 is provided protrusions 107a and 107b which can engage with the outer peripheral portions of the upper mold base plate 109 and the lower mold base plate 102, respectively, by which the pressure or reaction force of a pressurizing medium in a bladder B, which is applied to the upper side mold 108 and the lower side mold 103, is canceled by the protrusions 107a and 107b.

The toothed flange 110b at the upper central portion of the connecting block 110 can be engaged with and disengaged from the tip end of a known tire mold clamping device C.

Reference character T denotes a tire, and B denotes a bladder. The upper part of the bladder B is held by an upper clamp ring assembly E, and the lower part thereof is held by a lower clamp ring assembly F. The upper clamp ring assembly E is operated by a center post 116 of a known bladder operating mechanism D.

A passage (not shown) for supplying and discharging a heating/pressurizing medium is provided in the bladder B.

According to the tire mold assembly M shown in FIG. 9, the internal reaction force acting on the upper side mold 108 and the lower side mold 103 is canceled by the upper and lower protrusions 107a and 107b of the segment 107, the upper mold base plate 109, and the lower mold base plate 102, so that the mold is held so as to be not opened. Further, the internal reaction force acting on the tread mold 105 is canceled by the toothed flange 114a of the lock ring 114, the upper cover plate 112, the connecting block 110, and the toothed flange 110a so that the mold is held so as to be not opened.

Therefore, even if the mold M is disengaged from the upper mold attaching plate 1 after the mold is closed, the mold does not open, and vulcanization is continued.

Next, the tire mold assembly M shown in FIG. 10 will be described.

The left half of FIG. 10 shows a case where a conventional two-piece mold is mounted as a tire mold, showing a state in which vulcanization is being carried out by holding the mold under pressure against the internal reaction force of the heating/pressurizing medium in a bladder B. The right half of FIG. 10 shows a case where a conventional split mold device (the split mold device itself has no function of blocking the internal reaction force) is mounted as a tire mold, showing a state immediately after the mold is closed (before the start of pressurization).

Reference numeral 1 denotes an upper mold attaching plate mounted on a movable beam 2 of a vulcanizing press, and A denotes upper mold clamping devices installed to the mold attaching plate 1. By the upper mold clamping devices A, an upper mold $M_2$ and a heating plate 200a for heating are installed to an upper lock member 200 connected to the mold attaching plate 1 via a heat insulating material 201. At the lower end of outer periphery of the upper lock member 200, a flange 200b is provided.

Reference numeral 3a denotes a plurality of stanchions erected on a base 3 of the vulcanizing press, 202 denotes a lower lock member fixed to the stanchions 3a, 202a denotes a central portion of the lower lock member 202, and 203 denotes a lower mold attaching plate which is raised and lowered by being guided by the central portion 202a. A lower mold $M_1$ is mounted to the lower mold attaching plate 203.

The contact portion between the lower mold attaching plate 203 and the lower mold $M_1$ is a heating plate. The outer peripheral end of the lower lock member 202 faces the flange 200b and has a toothed flange 202b.

A toothed flange 209a of a lock ring 209 rotatably mounted to the flange 200b and the toothed flange 202b are engaged with and disengaged from each other.

A plurality of pressurizing cylinders 204 are installed to the lower lock member 202. A piston rod 204a of the pressurizing cylinder 204 passes through the lower lock member 202, and abuts against the lower mold attaching plate 203.

A plurality of leveling blocks 205 are provided on the lower lock member 202. The leveling blocks 205 restrict the downward movement of the lower mold attaching plate 203 when the pressurizing cylinder 204 is not pressurized, and provides a small gap between the upper surface of the flange 209a of the lock ring 209 and the lower surface of the flange 202b of the lower lock member 202 so that the lock ring 209 can be turned.

By a rod 206 suspended from the lower mold attaching plate 203 and a belleville spring 207, the lower mold attaching plate 203 abuts against the leveling block 205 when the cylinder 204 is not pressurized. Reference numeral 208 denotes a pressure fluid supply passage to the pressurizing cylinder 204.

Next, the split mold device shown at the right of FIG. 10 will be described.

The lock ring 209 is turned so that the toothed flange 209a at the lower part of the lock ring 209 passes through the toothed flange 202b of the lower lock member 202, and the upper mold portion $M_2$ is raised by being connected to the mold attaching plate 1 by the operation of the mold clamping devices A. The upper mold portion $M_2$ comprises an upper mold base plate 210, an upper side mold 211 attached to the base plate 210, an outer ring 212 installed to the upper block member 200, a divided tread mold 213, a segment 214 which can slide on the slant surface of the outer ring 212, and a connecting shaft 215 erected at the center of the upper mold base plate 210.

The connecting shaft 215 can be engaged with and disengaged from a known split mold operating mechanism C (not shown).

The lower mold portion $M_1$ comprises a lower mold base plate 216 mounted to the lower mold attaching plate 203 and a lower side mold 217.

The upper end of a bladder B is held by an upper clamp ring 218, and the lower end thereof is held by a lower clamp ring 219. The upper clamp ring 218 is connected to and operated by a center post 220 of a known bladder operating mechanism D.

Next, a tire vulcanizing method, which is carried out by using the mechanical crank press shown in FIGS. 1 and 2 (or the hydraulic vulcanizing press shown in FIGS. 7 and 8) and the tire mold assembly M shown in FIG. 9 (or the tire mold assembly M shown in FIG. 10), will be described in detail.

(1) During vulcanization, the tire mold clamping device C is released. (2) After vulcanization has been completed in one tire mold M, the tire mold clamping device C on the side of this tire mold assembly M is operated, so that the upper mold $M_2$ is connected to the upper mold attaching plate 1. (3) The upper mold attaching plate 1 is raised and the upper mold $M_2$ connected to the upper mold attaching plate 1 is opened, while on the side of the other tire mold assembly M, vulcanization is continued with the upper mold $M_2$ being closed. (4) On the side of one tire mold assembly M in which vulcanization has been completed, the removal of the vulcanized tire and the insertion and forming of an unvulcanized tire are carried out in sequence by the procedure similar to the conventional one, and then the upper mold $M_2$ is closed. Then, a predetermined heating/pressurizing medium is supplied to start vulcanization. For the period from this time to the completion of vulcanization, the tire mold clamping device C is released. (5) On the side of the other tire mold assembly M as well, when vulcanization is completed and the time of opening/closing the upper mold $M_2$ is reached, the upper mold $M_2$ is opened and closed by the same procedure.

In the tire vulcanizing method using a tire vulcanizer in accordance with the present invention, as described above, after vulcanization has been completed in one tire mold, the tire mold clamping device on the side of this tire mold assembly is operated, so that the upper mold is connected to the upper mold attaching plate. The upper mold attaching plate is raised and the upper mold connected to the upper mold attaching plate is opened, while on the side of the other tire mold assembly, vulcanization is continued with the upper mold being closed. On the side of one tire mold assembly in which vulcanization has been completed, the removal of the vulcanized tire and the insertion and forming of an unvulcanized tire are carried out in sequence by the procedure similar to the conventional one, and then the upper mold is closed. Then, a predetermined heating/pressurizing medium is supplied to start vulcanization. For the period from this time to the completion of vulcanization, the tire mold clamping device is released. On the side of the other tire mold assembly, when vulcanization is completed and the time of opening/closing the upper mold is reached, the upper mold is opened and closed by the same procedure. That is to say, in one tire mold assembly, the removal of the vulcanized tire, the forming of the next unvulcanized tire, and the mold closing operation are carried out, while in the other tire mold assembly, vulcanization is continued. Therefore, plural kinds of tires requiring different vulcanization times can be vulcanized even by using a conventional mechanical crank press.

Although right and left individual mold opening/closing mechanisms are required on the conventional hydraulic vulcanizing press, in this case plural kinds of tires requiring different vulcanization times can be vulcanized by means of a single mold opening/closing mechanism.

We claim:

1. A tire vulcanizing method using a tire vulcanizer, said tire vulcanizer comprising a vulcanizing press with two sets of tire mold assemblies, said tire mold assemblies being composed of an upper mold and a lower mold, said vulcanizing press including:
a set of movable beams;
two sets of upper mold attaching plates fixed onto said movable beam;
upper mold clamping devices provided on said two sets of upper mold attaching plates so as to be individually or simultaneously operated, and having a clamp claw at a distal end portion thereof; and
tire mold clamping devices provided on said two sets of upper mold attaching plates so as to be individually or simultaneously operated, and having a claw at a distal end portion thereof;
said upper mold including:
a clamp pawl engaged with said clamp of said upper mold clamping device; and
a pawl engaged with said pawl of said tire mold clamping device, said method comprising:
operating said upper mold clamping device on the side of one tire mold assembly after vulcanization has been completed in one tire mold assembly;
engaging said clamp pawl of said tire mold clamping device with said clamp pawl of said upper mold clamping device so that said upper mold is connected to said upper mold attaching plate;
raising said moveable beam and said upper mold attaching plate to open the upper mold;
continuing vulcanization with the upper mold closed on the side of the other tire mold assembly;
sequentially carrying out removal of the vulcanized tire and insertion and formation of an unvulcanized tire on the side of the one tire mold assembly after said vulcanization has been completed;
lowering said movable beam and said upper mold attaching plate to close said upper mold;
supplying a predetermined heating/pressurizing medium to start vulcanization;
releasing said upper mold clamping device until vulcanization has been completed;
opening and closing the other upper mold with the use of said upper mold clamping device when vulcanization is completed on the side of the other tire mold assembly and the time of opening and closing said upper mold is reached; and
individually or simultaneously opening and closing said two sets of tire mold assemblies to carry out vulcanization.

2. A tire vulcanizing method using a tire vulcanizer, said tire vulcanizer comprising a vulcanizing press with two sets of tire mold assemblies having an upper mold and a lower mold, said vulcanizing press including:
a set of movable beams;
two sets of upper mold attaching plates fixed onto said movable beam;
upper mold clamping devices provided on said two sets of upper mold attaching plates so as to be individually or simultaneously operated, and having a clamp claw at a distal end portion thereof; and
tire mold clamping devices provided on said two sets of upper mold attaching plates so as to be individually or simultaneously operated, and having a claw at a distal end portion thereof;
said upper mold including:
a clamp pawl engaged with said clamp pawl of said upper mold clamping device; and
a pawl engaged with said pawl of said tire mold clamping device, said method comprising:
operating said tire mold clamping device on the side of one tire mold assembly after vulcanization has been completed in one tire mold assembly;
engaging said clamp pawl of said tire mold clamping device with said clamp pawl of said upper mold clamping device so that said upper mold is connected to said upper mold attaching plate;
raising said movable beam and said upper mold attaching plate to open the upper mold;
continuing vulcanization with the upper mold being closed on the side of the other tire mold assembly;
sequentially carrying out removal of the vulcanized tire and insertion and formation of an unvulcanized tire on the side of the one tire mold assembly after said vulcanization has been completed;
lowering said movable beam and said upper mold attaching plate to close said upper mold;

supplying a predetermined heating/pressurizing medium to start vulcanization;

releasing said tire mold clamping device until vulcanization has been completed;

opening and closing the other upper mold with the use of said tire mold clamping device when vulcanization is completed on the side of the other tire mold assembly and the time of opening and closing said upper mold is reached; and individually or simultaneously opening and closing said two sets of tire mold assemblies to carry out vulcanization.

* * * * *

UNITED STATES PATENT AND TRADEMARK OFFICE
CERTIFICATE OF CORRECTION

PATENT NO.   : 5,863,484
DATED        : January 26, 1999
INVENTOR(S)  : Akira HASEGAWA et al It is certified that error appears in the above-indentified patent and that said Letters Patent is hereby corrected as shown below:

On the title page,

[30]  Foreign Application Priority Data

Dec. 22, 1994  [JP]  Japan ...............6-320126

Signed and Sealed this

Twentieth Day of July, 1999

*Attest:*

*Attesting Officer*

Q. TODD DICKINSON

*Acting Commissioner of Patents and Trademarks*